US007702358B2

(12) United States Patent  
Meyers

(10) Patent No.: US 7,702,358 B2  
(45) Date of Patent: Apr. 20, 2010

(54) SYSTEM AND METHOD FOR COMMUNICATIONS OF CARGO CONTAINERS IN A CONTAINER SECURITY SYSTEM USING WIRELESS AD-HOC NETWORKING TECHNIQUES

(75) Inventor: Richard C. Meyers, Longboat Key, FL (US)

(73) Assignee: System Planning Corporation, Arlington, VA (US)

( * ) Notice: Subject to any disclaimer, the term of this patent is extended or adjusted under 35 U.S.C. 154(b) by 827 days.

(21) Appl. No.: 11/598,823

(22) Filed: Nov. 14, 2006

(65) Prior Publication Data

US 2007/0115859 A1 May 24, 2007

Related U.S. Application Data

(60) Provisional application No. 60/735,843, filed on Nov. 14, 2005.

(51) Int. Cl.  
*H04M 1/00* (2006.01)

(52) U.S. Cl. ............... 455/552.1; 455/553.1; 455/41.2; 340/539.13

(58) Field of Classification Search ............. 455/552.1, 455/42.1, 553.1; 340/539.13  
See application file for complete search history.

(56) References Cited

U.S. PATENT DOCUMENTS

| 6,429,810 | B1 * | 8/2002 | De Roche | 342/357.07 |
| 6,734,796 | B2 * | 5/2004 | Forster et al. | 340/572.3 |
| 7,339,469 | B2 * | 3/2008 | Braun | 340/539.13 |
| 2006/0080819 | A1 * | 4/2006 | McAllister | 29/403.3 |
| 2006/0152357 | A1 * | 7/2006 | Hyde | 340/539.13 |
| 2006/0293770 | A1 * | 12/2006 | Masunaga | 700/90 |
| 2007/0132547 | A1 * | 6/2007 | Jung | 340/5.6 |

* cited by examiner

*Primary Examiner*—Danh C Le

(57) ABSTRACT

A system and method for communications between a plurality of shipping containers using a short range or local area wireless communication device is provided. The system also contains a cellular communications device, a satellite communications device, or both, which are used to transmit information to, and receive commands from remote central monitoring station. The system includes a method which creates dynamic links between the containers using the short range channel. Containers are organized in networks and sub networks, and have built in redundancy features.

4 Claims, 4 Drawing Sheets

SYSTEM AND METHOD FOR COMMUNICATIONS OF CARGO CONTAINERS IN A CONTAINER SECURITY SYSTEM USING WIRELESS AD-HOC NETWORKING TECHNIQUES

CLAIM OF PRIORITY

The present invention claims priority to U.S. Provisional Patent Application No. 60/735,843, filed Nov. 14, 2005.

BACKGROUND OF THE INVENTION

1. Field of the Invention

The present invention relates generally to container security and supply chain management and, more particularly, to the internal communications within a shipping container security system which needs to provide a high degree of operational reliability.

2. Background of the Invention

In today's security conscious transportation environment, there is a strong need to cost-effectively and accurately monitor the contents of containerized shipments. This need exists both in the United States and abroad.

Despite the strong need, until recently few solutions, if any, have been able to provide the protection and accuracy needed to suit the transportation industry and the government agencies charged with monitoring shipments. This lack of an acceptable solution is due to many factors which complicate interstate and international shipping. Shipping containers are used to transport most of the commerce entering, leaving, and transiting or moving within the United States. It is estimated that there are over 6 million containers moving in global commerce. Shipping containers have revolutionized the transportation of goods by greatly reducing the number of times goods must be loaded and unloaded during transport. However, at the same time, this same advantage has created a major problem in that it is very difficult to monitor and track the contents of each container during transport.

Beyond their basic construction, monitoring the content of shipping containers is also difficult because these containers are carried through numerous transit points and depots all over the world and it is impractical to stop and check the contents of each container individually at each point of transit. Dealing with this problem, the U.S. Customs Service estimates it can inspect just 5% of the 6 million containers entering and reentering the U.S. each year. Accordingly, agencies such as the United States Customs Service are seeking improved ways to achieve cargo container security and integrity upon arrival at the ports of entry of the United States.

To date, many government agencies have initiated programs to improve container security. These include many useful elements that are intended to preclude their use by terrorists. However, at present, none of the container tracking systems in use provides a way to assure the integrity of the contents of the containers to assure global container security. Current computer tracking systems are effective at monitoring the location of individual containers from point of origin to destination and maintaining an inventory of loaded and empty containers. Many of these systems rely on communications devices mounted on the containers that send messages regarding the status of to satellites or ground stations, from which the messages are rerouted to shipping companies, freight forwarders, and companies through a central monitoring station. However, these tracking systems are unable to guarantee that a given container does not contain contraband. Furthermore, the proper operation of the communication devices of these systems is critical, and when it is not possible to communicate, the entire functionality of the system is compromised. The invention described herein, provides a safe and reliable alternative method of communication when the primary communication means are not available.

3. Description of the Related Art

A container security system as described by System Planning Corporation (SPC) (U.S. Pat. No. 7,098,784) herein referred to as "the SPC Invention", performs many of the functions to monitor containers, their content, and to detect tampering within a container during transit. This is accomplished through a device is which located on a container, which performs multiple functions. Some of these functions may include controlling various sensors, collected the data from these sensors and transmitting this data back to a central monitoring station. The central monitoring stations may also send commands and information to individual containers equipment with this device.

To enable information to be transmitted to and from the container, there are several communications subsystems including a satellite or cellular communications device, or both. This system also describes the utilization of a short range wireless or local area communication channel to communicate with various sensors and other elements within the container. The system utilizes the satellite or cellular communications channel to communicate and send status and alarms to a central monitoring station.

In the SPC invention, the short range wireless channel is generally used to interface with various external sensors such as container door position, proximity sensors, and other sensors which are not physically located in the controller and communications unit but are within the container.

The cellular and satellite channels, are used to relay information collected from the sensors, location, and other information related to the container back to a central monitoring station located in a different geographical area, in most cases some distance away.

In some cases the satellite or cellular communications channel as described in the above invention by SPC is not capable of providing reliable communications. This is because of poor radio frequency propagation characteristics when containers may be stacked in a yard, stacked on the deck of a ship, or located within the hull of a ship. This may occur for the satellite mode when a container does not have a direct line of sight to an overhead satellite, or a there is some obstruction where the satellite link cannot be closed.

On the cellular side, this may also occur because of weak or poor radio frequency signals, such as is commonly seen within a building, or if a particular container may be within the hull of a ship or out of range of a cellular tower or base station.

To address the problem and limitations noted above, a system which can provide an alternative communications path from any given container to the central monitoring station is provided. In the invention described by Mesh Networks, Inc. (Maitland, Fla.) titled "Ad Hoc peer-to-peer mobile radio access system interfaced to the PSTN and cellular networks" (U.S. Pat. No. 6,961,575), a system is described for the cellular network application which provides the basis for a dynamically configurable network comprised on multiple elements, each of which can communicate with the each other on a peer-to-peer basis.

The limitation of this and other inventions related to ad-hoc networking is that they are specifically directed toward applications in wireless communication networks such as cellular or radio, and that they do not apply these concepts to that of a container security system.

SUMMARY OF THE INVENTION

To address the problems and limitations noted above, a system and method for communicating information from the container to a central monitoring station when a satellite or cellular channel is not possible is provided. The embodiments of this invention may utilize a short range wireless connection or a wireless local area connection (WLAN) to communicate between containers themselves, and may implement a series of short range wireless connections in a manner consistent with ad-hoc networking techniques.

In these cases where the satellite or cellular link is not available, the short range wireless interface may be able to communicate with neighboring containers, and these neighboring containers may be able to communicate with others, and so on. In most configurations, eventually there is a container within the appropriate proximity to be able to communicate using the satellite or cellular channel. Successful communications may be achieved by forming a series of communications relay links using the short range wireless interface in order to send and receive information to the central monitoring station that would normally be sent directly by a container through their respective satellite or cellular link. Furthermore, this network may be formed on a dynamic basis, using algorithms that calculate the best and most efficient communications path given any physical configuration of containers.

The accompanying drawings, which are incorporated in and constitute a part of this specification, illustrate various embodiments of the invention and, together with the description, serve to explain the principles of the invention.

DESCRIPTION OF THE PREFERRED EMBODIMENTS

The present invention provides a unique system for providing more robust communications for systems which monitor and report environmental information regarding the status of the shipping container.

Throughout this specification, preferred embodiments of the invention are described in detail below with reference to the accompanying drawings. In the embodiments, various examples and illustrative embodiments are provided. It should be understood that these embodiments and examples are provided purely for purposes of illustration. The present invention is limited solely by the claims appended hereto.

Figure 1:
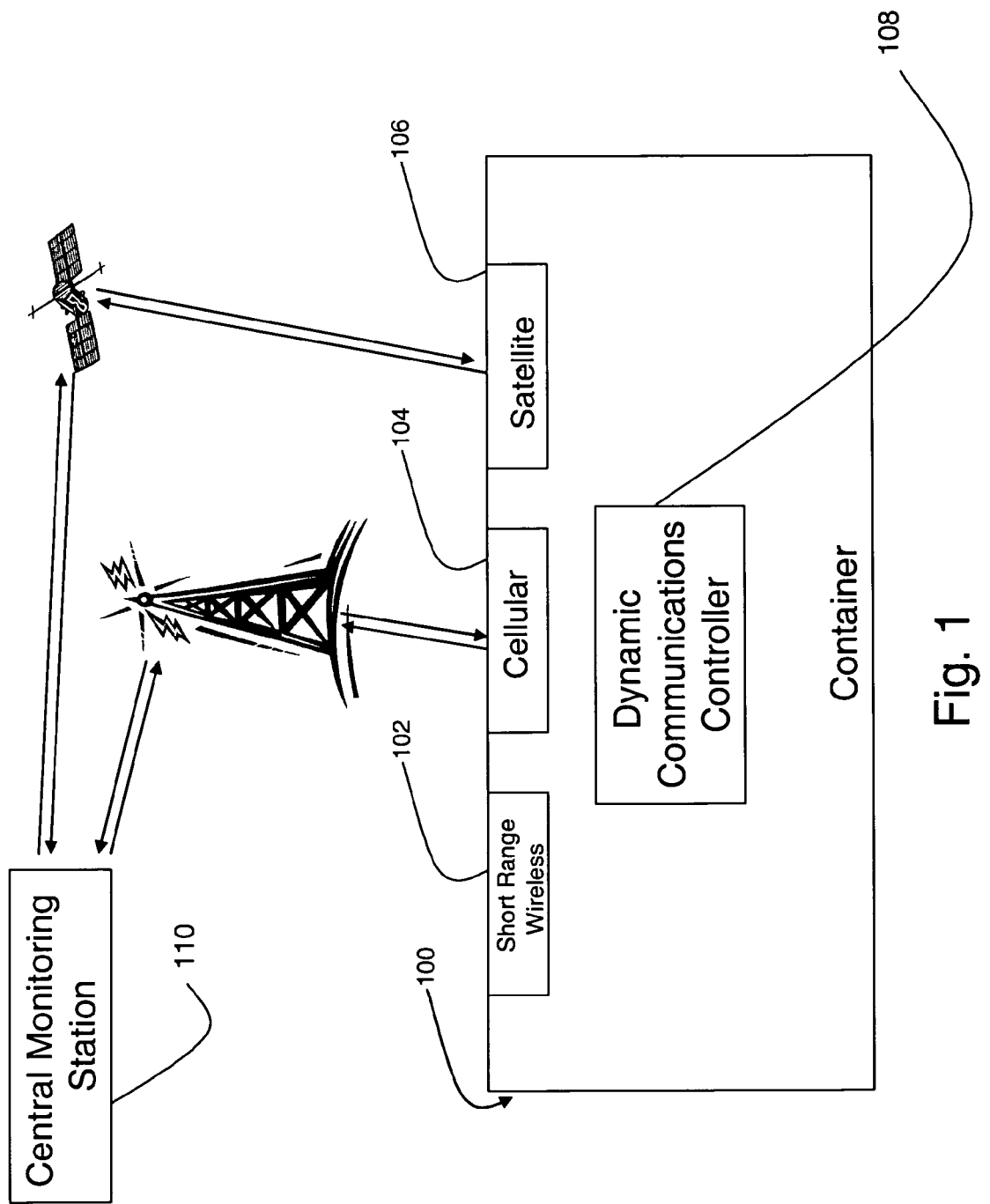
FIG. 1 shows a functional configuration of the various communication channels in an intelligent container security system according to an embodiment of the invention.

With reference now to FIG. 1, and for the purposes of explanation, the basic container communications system of the present invention comprising three major communications sub-systems: a short range wireless communications channel 102; either a cellular communications channel or other longer range wireless communications channel 104; a satellite communications channel 106; or both 104 and 106 together. Each of these communications links is used in conjunction with an intelligent controller 108, and is mounted on the inside or outside of a container, usually near the door. Ideally these communications subsystems along with the controller are generally housed within a single unit, however may also be comprised of separate functional units under common control.

The short range wireless channel protocol or wireless local area network (WLAN) 102 may be any one of a number of standards such as Bluetooth, Zigbee, 802.11, or any other standards based or proprietary wireless protocol capable of transmitting data within a few feet to a several hundred feet.

The satellite channel 106 may include a satellite transceiver device, which may communicate with either geosynchronous (GEO) or Low Earth Orbit (LEO) satellite in a network. It may operate at any band commonly used by satellites including, but note limited to, C-band, Ku-band, L-Band, S-Band, or VHF.

The cellular channel 104 may include a device that typically may use one of the common cellular standards such as GSM, CDMA, or North American TDMA. However, for purposes of this invention the cellular channel is not strictly limited to these standards, but may also include other current and future standards, as well as any wireless protocol and network suited to transmit data over long distances.

Figure 2:
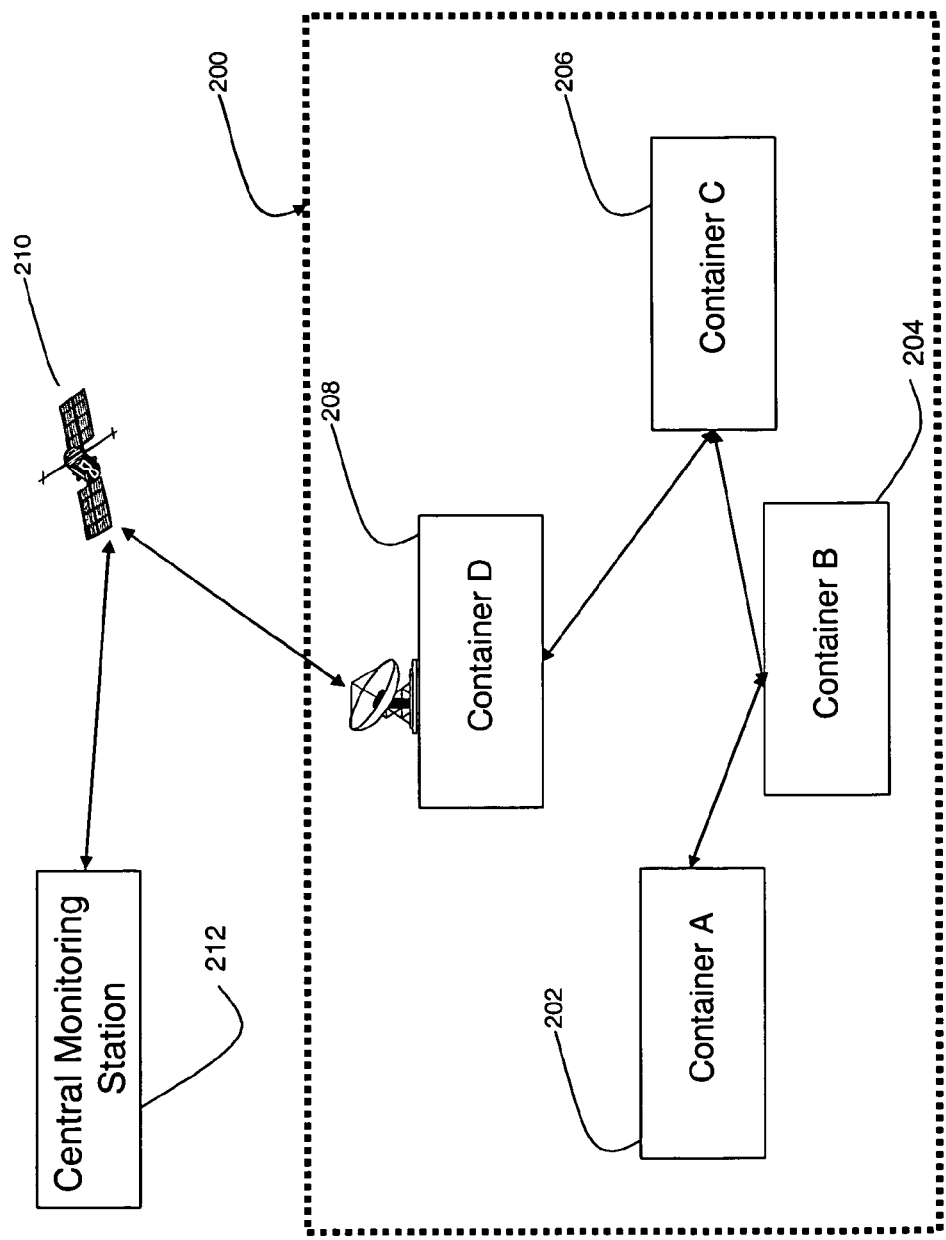
FIG. 2 shows multiple containers operating in an ad-hoc network configuration.

As in the example shown in FIG. 2, the present invention utilizes the short range wireless channel 102 to provide a communications path between multiple containers, such that if any given container is unable to communicate with a central monitoring station 110 through an alternative cellular or satellite channel, a communications path may be established through one or a series of successive connections between individual containers. In FIG. 2, container A 202, is routed to container B 204. Container 204 acts as a relay and routes the information originally sent from container A 202 to container C 206, and on to container D 208. At this stage container 208 has access to a satellite which is then used to transmit the information through the satellite 210 to the central monitoring station 212. In this case the satellite channel was used for example purposes, however the cellular channel could alternatively be used.

Further, an embodiment of the present invention utilizes ad-hoc dynamic routing algorithms on the short range wireless channel 102 to provide a method of establishing connections between the containers 202, 204, 206, and 208. These algorithms are a family of complex routing and assignment techniques that determine the best routing configuration for any given arrangement of nodes, in this case cargo containers.

Figure 4:
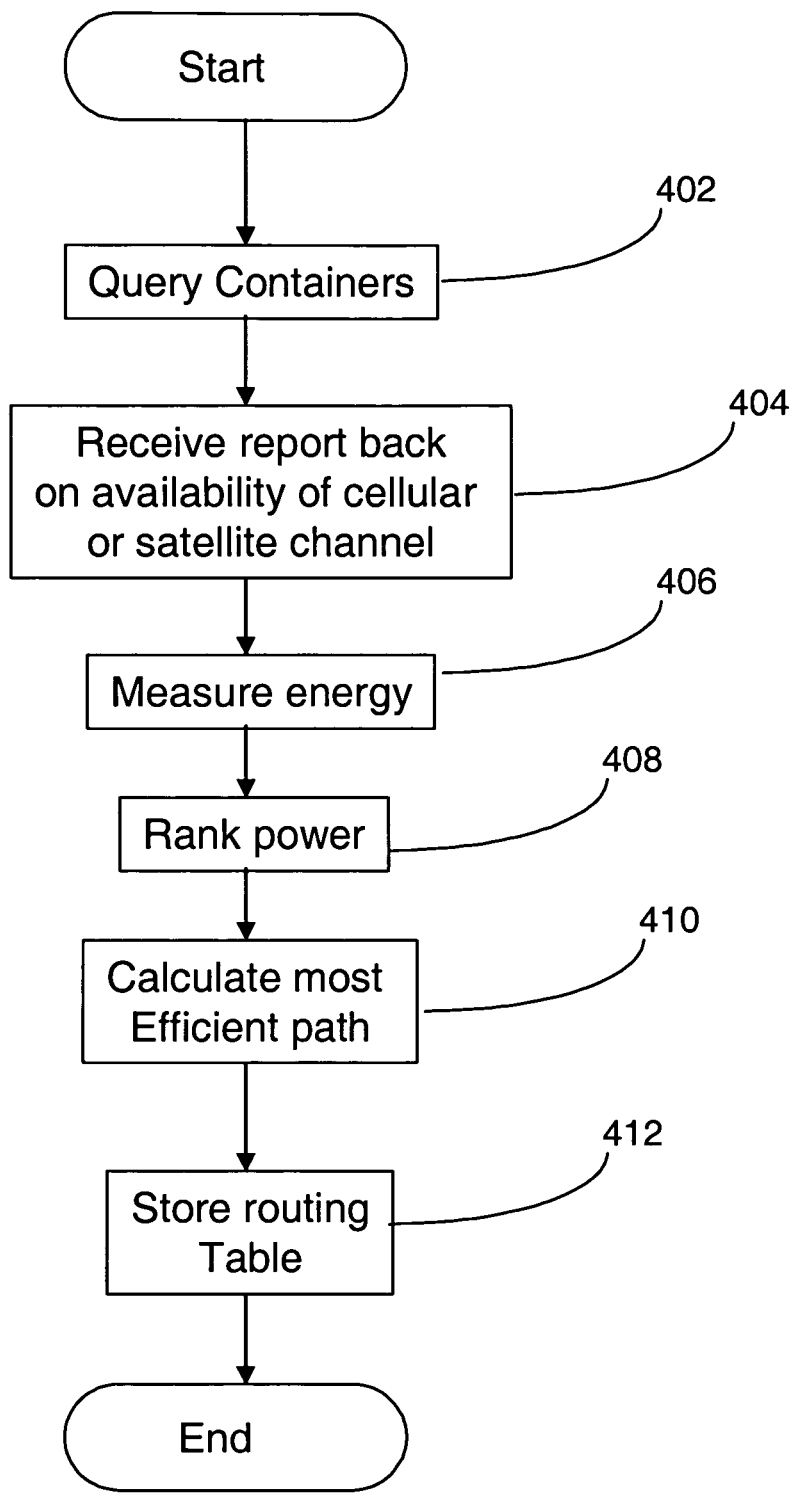
FIG. 4 shows a flow chart of the dynamic channel assignment method using the short range wireless channel.

In embodiments of the present invention, the method as shown in FIG. 4 may run on the control element of each container. Initially each container in the neighboring area within the transmit and receive range of the short range communications device is queried as shown in 402. Then each container may broadcast information to neighboring containers relating to the availability of the cellular or satellite link and this report is received back by said querying container 404. The power of the signal transmitted from all of its neighbors that fall above a certain pre-set threshold value is measured as in 406. The received power is then ranked 408, and this information can be used to establish the best possible radio frequency links for a physical configuration.

This availability information may then be used by the routing method 410 to set up the most efficient paths or connections from each container to another, using a connection assignment or request-acknowledge scheme. This new connection information is then stored in a routing table which indicates the current connection topology for all containers in a given network. The routing table is then updated and stored.

Since embodiments of the present invention comprise using dynamic networks routing algorithms in the container security application, as opposed to the algorithms themselves, the mathematics and other specifics in these algorithms are not described in details herein. Examples of suitable algorithms may be found for example in the text "AD HOC NETWORKS: Technologies and Protocols" by Prasant Mojapatra and Srikanth Krishnamurthy, which is hereby incorporated by reference.

The control of the routing between the containers may be achieved in two ways, as determined by a master controller or using a peer-to-peer control techniques:

In the first case, a single container within a certain area may be designated as a master, and this container may send and receive information from other containers, and it may execute the call routing algorithms and assign the container communication paths, or;

Each container may execute the same routing algorithm, and issue connection requests on a peer-to-peer basis, and receive acknowledgements back from one or more containers. While this connection protocols is more complex and has certain disadvantages such as higher contention, it does have the advantage of having a homogeneous network and a much higher level of redundancy in the event that the designated master fails.

Figure 3:
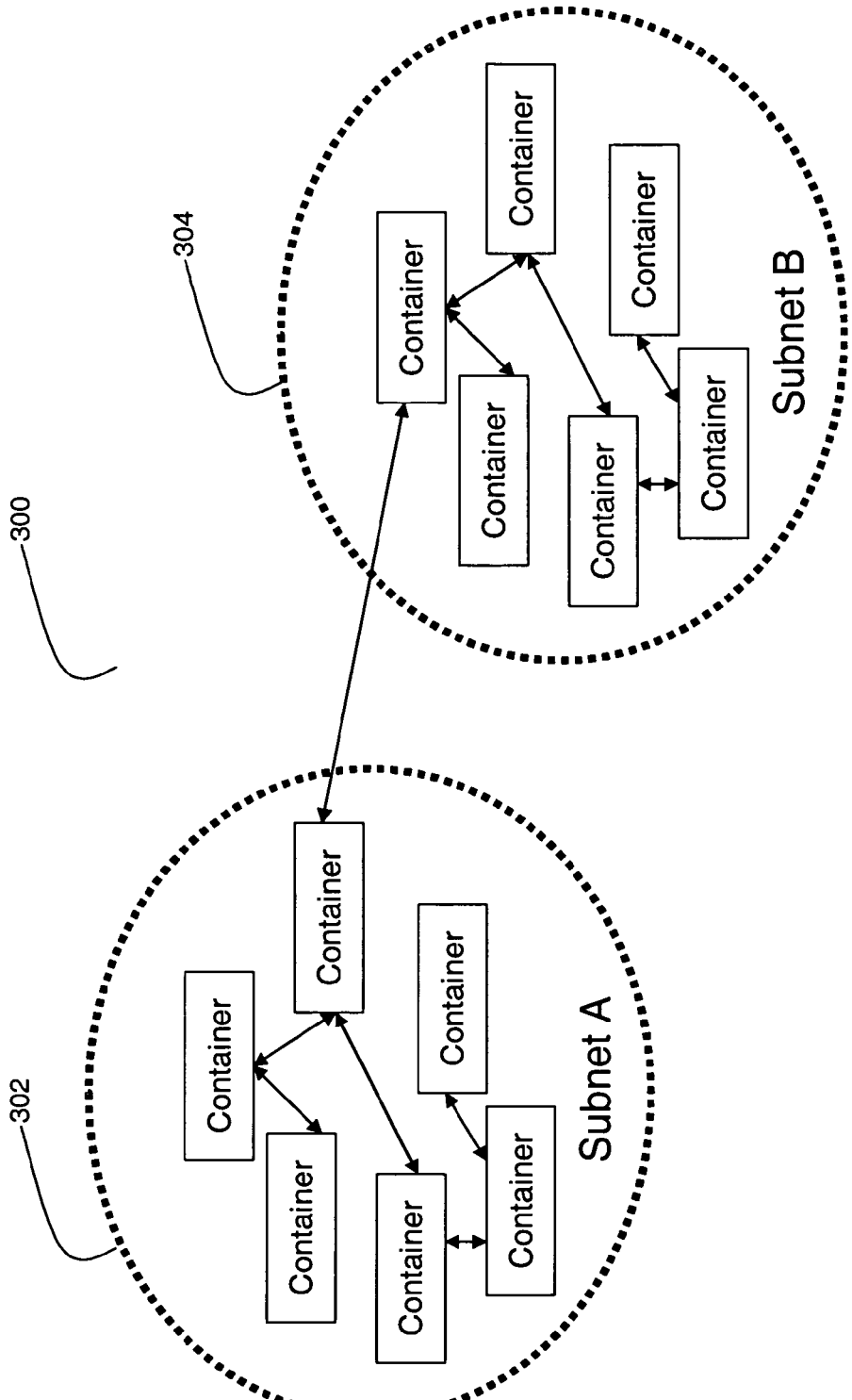
FIG. 3 shows multiple containers forming a sub-network, and multiple sub-networks operating in an ad-hoc network configuration.

The configuration of a various containers organized as groups can be considered a network, and multiple networks can also be formed with unique communication paths between the designated master containers. As indicated in FIG. 3, this configuration includes of a plurality of networks which make up sub-networks 302 and 304, and the communication channels between the networks themselves can be organized using the same dynamic ad-hoc routing as individual containers. This concept extends the same topology principles to extremely large networks as for individual containers within a smaller sub-network, so the application is fully scalable.

A present invention also embodies an inherent redundancy scheme in the event that the satellite or cellular communication channels on any given container have failed, or encounters and equipment problem. This scenario is very similar in functionality to the case where the satellite or cellular channels are simply not available due to radio frequency propagation issues. In this configuration a container for which the satellite or cellular channel has failed, may use the short range wireless interface to relay the information a container that has an operational and available satellite or cellular channel.

What is claimed is:

1. A method for dynamic assignment of communications links between a plurality of containers using a short range wireless communications device associated with each container, the method comprising:

querying each container within the proximity of each short range receiver;

collecting reports back of whether the queried containers have access to a satellite or cellular channel;

measuring energy using a detector which surveys the containers within the proximity of each short range receiver to detect the power of each said short range transmitter for each neighboring container;

ranking the power estimates received from the various container elements;

calculating a most efficient path from any given container to another container, or through a series of containers acting as relays, whereby pertinent data from any given container is relayed to a container having access to a cellular or satellite channel; and storing a routing table indicating a current connection topology for all containers in an ad-hoc network configuration.

2. The method of claim 1, wherein the method is performed on a peer based topology running on each container independently, and connections between containers are determined by a voting method and a open network request-acknowledge based protocol.

3. The method of claim 1, wherein the method is performed on a master-slave topology such that at a given time a single container is designated as a master container controlling the connection paths for all other containers within the network, and all other containers with a specified proximity are designated as slave containers.

4. The method of claim 1, further including application to said containers organized into groups or sub networks connections, in a hierarchical manner, whereby multiple sub networks comprising a plurality of individual containers may exist within the same larger network and the communication paths are controlled by a designated network master container for multiple sub networks.

* * * * *